United States Patent
Clifford et al.

[15] 3,666,784
[45] May 30, 1972

[54] PROCESS FOR PREPARING α,α-FLUORINATED ALKYL ISOCYANATES

[72] Inventors: Alan F. Clifford; Thomas C. Rhyne; James W. Thompson, all of Blacksburg, Va.

[73] Assignee: The United States of America as represented by the United States Atomic Energy Commission

[22] Filed: Aug. 27, 1969

[21] Appl. No.: 853,541

[52] U.S. Cl. ..................260/453 P, 73/75, 73/88, 73/151, 73/157 R, 73/166, 260/77.5 CH, 260/77.5 AP, 260/453 R, 260/453 PC, 260/453 PH, 260/453 AF, 260/453 AR, 260/453 AL, 260/454, 260/553 R, 260/553 A, 260/553 E

[51] Int. Cl. ..................C01b 17/45, C07c 119/04

[58] Field of Search ..................260/453 A, 453 AL, 453 AR; 23/357

[56] References Cited

UNITED STATES PATENTS

| | | |
|---|---|---|
| 3,118,923 | 1/1964 | Fawcett et al. ..................260/453 |
| 3,347,644 | 10/1967 | Tullock..................23/357 |
| 2,617,817 | 11/1952 | Ahlbrecht et al...................260/453 |
| 2,860,154 | 11/1958 | Kauer..................260/453 |
| 3,468,924 | 9/1969 | Gale..................260/453 |
| 3,518,293 | 6/1970 | Klauke et al...................260/453 |

OTHER PUBLICATIONS

Tullock et al., J. Am. Chem. Soc., Vol. 86, pp. 357 to 361 (1964)

Knunyants et al., Chemical Abstracts, Vol. 65, 10482 (1966)

Primary Examiner—Floyd D. Higel
Attorney—Roland A. Anderson

[57] ABSTRACT

This invention relates to a method for synthesizing an organic isocyanate which is doubly fluorinated at the carbon position adjacent to the isocyanate group which comprises reacting at a temperature of from room temperature up to 80° C. carbonyl fluoride with an organic nitrile, RCN, in anhydrous liquid hydrogen fluoride or an inert hydrocarbon containing catalytic quantities of fluoride to produce a compound having the formula $RCF_2NCO$ where R is selected from alkyl, cycloalkyl, aryl, alkaryl, alkenyl, or cycloalkenyl.

2 Claims, No Drawings

PROCESS FOR PREPARING α,α-FLUORINATED ALKYL ISOCYANATES

BACKGROUND OF THE INVENTION

The invention described herein was made in the course of, or under, contracts with the U. S. Atomic Energy Commission and the National Science Foundation. It relates to a method for preparing iso- and isothio-cyanates by the reaction of carbonyl halides with triple-bonded nitrogen-bearing compounds such as thiazyl fluorides and organic nitriles in an anhydrous hydrogen fluoride solvent medium to produce halogenated isocyanates. In a parallel reaction, corresponding isothiocyanates are produced by reaction of the nitrogen-bearing compound with $CSX_2$ where X is a halogen atom.

SUMMARY OF THE INVENTION

A need exists for, and it is an object of this invention to provide, a simple and direct synthetic route for producing halogenated, particularly fluorinated, iso- and isothio-cyanate compounds. In one embodiment of this invention we have been able to demonstrate a simple and neat synthetic route to the production of pentafluorosulfanyl isocyanate, $SF_5NCO$, in which the usual alkyl or aryl groups are substituted by the hydrolytically and oxidatively stable, hydrophobic pentafluorosulfanyl group, $SF_5$. The preparation of $SF_5NCO$ consists of dissolving stoichiometric quantities of thiazyl, $NSF_3$, and carbonyl fluoride, $COF_2$, in anhydrous liquid hydrogen fluoride and, after allowing the mixture to stand for a period of time, separating the desired product by fractionation. A similar reaction occurs where one of the fluorine groups in $NSF_3$ is substituted by a secondary amine group such as $-N(C_2H_5)_2$.

The preparation of pentafluorosulfanyl isocyanate is envisioned by us as an addition reaction involving the addition of $COF_2$ across the triple bond in $NSF_3$. By analogy, we then envision that carbonyl halides could add across similar triple-bonded compounds of nitrogen such as organic nitriles. Acting on the basis of this proposed mechanism, we have confirmed that carbonyl fluoride does indeed react with organic nitriles in anhydrous liquid hydrogen fluoride or inert hydrocarbon such as benzene to produce a doubly fluorinated isocyanate in which the alpha carbon position directly adjacent to the isocyanate group is linked to the fluorine atoms. In a similar manner, corresponding isothiocyanate compounds can be produced by reaction of a suitable organic nitrile with $CSF_2$. The synthesis of the α,α-fluorinated organic isocyanate compounds may be represented by the following general formula:

$$RCN + COF_2 \rightarrow RCF_2NCO$$

where R is an alkyl, cycloalkyl, aryl, alkaryl, alkenyl, or cycloalkenyl group where the reaction is conducted at a temperature in the range 0° C. to 80° C. in an anhydrous liquid hydrogen fluoride solvent medium. The reactants may also be dissolved in an inert organic solvent such as benzene in which case catalytic quantities of HF are employed to insure a satisfactory yield.

Having described the invention in general terms, the following examples describe the double aspects of the invention in which the first example illustrating the preparation of pentafluorosulfanyl isocyanate is described and in the second and third examples the synthesis of an α,α doubly fluorinated organic isocyanate, α,α-difluoroethyl isocyanate represented by the formula $CH_3CF_2NCO$ is demonstrated.

EXAMPLE I

An equimolar mixture of $NSF_3$ and $COF_2$ amounting to a total of 2.00 grams was condensed into a stainless steel cylinder and 0.55 gram of HF added by condensation. This resulted in a 1:1:2.3 mole ratio of $NSF_3:COF_2:HF$. The cylinder was closed and allowed to stand for four days at room temperature. The products were then separated by passage from the cylinder to a vacuum system through slush baths of various temperatures, the $SF_5NCO$ collecting in the trap at −112° C. Identification was made on the basis of the infrared spectrum and of the experimentally determined molecular weight—experimental, 169.1; calculated, 169.07. The $SF_5NCO$ was identified by the infrared absorptions at 2270, 910, and 879 cm$^{-1}$. The doublet at 910 and 879 cm$^{-1}$ is characteristic of the $SF_5$ group and the absorption at 2270 cm$^{-1}$ is characteristic of the NCO group.

EXAMPLE II

This example illustrates the preparation of a doubly fluorinated organic isocyanate; namely, α,α-difluoroethyl isocyanate.

A mixture of 0.22 gram (5.43 millimoles) of acetonitrile and 0.39 gram (5.89 millimoles) of carbonyl fluoride was condensed into a Monel cylinder. Five milliliters of anhydrous hydrogen fluoride was then added to the cylinder and the resultant mixture was allowed to stand at room temperature for about 72 hours. The contents of the cylinder were then condensed onto thoroughly dried sodium fluoride pellets and left in contact with the pellets at room temperature for about a few hours to remove the hydrogen fluoride. The unabsorbed material was then returned to the cylinder, which was warmed slowly while the gaseous products passed through cold traps set at −78°, −95°, −131°, and −196° C., respectively. The contents of these traps were then identified by infrared and proton nuclear magnetic resonance analyses. The material condensed at −131° C., identified as α,α-difluoroethyl isocyanate, $CH_3CF_2NCO$, was a white solid at −131° C. Its molecular weight of 107 was determined by mass spectrographic analysis and agreed with the calculated value. In water, the free nitrile hydrolyzed to acetamide, HF, and $CO_2$. The principal features of the infrared spectrum of $CH_3CF_2NCO$ were as follows:

| Frequency (cm$^{-1}$) | Assignment |
| --- | --- |
| 3035 | |
| 2415 | $CH_3$ asymm. stretch |
| 2283 | |
| 1439 | NCO asymm. stretch |
| 1173 | $CH_3$ stretch |
| 940 | $CF_2$ stretch |
| | CC stretch |

EXAMPLE III

This example illustrates an alternate method for the preparation of $CH_3CF_2NCO$.

In this case, acetonitrile (8.58 millimoles, 0.35 gram) and $COF_2$ (9.95 millimoles, 0.65 gram) were mixed with a small volume of thoroughly dried benzene. Anhydrous hydrogen fluoride (0.6 millimole, 0.013 gram) was then added to the mixture. The resultant mixture was then allowed to warm to room temperature and remained for various lengths of time. The yield of the desired $CH_3CF_2NCO$ product was time dependent and provided a yield of 3 per cent (based on $COF_2$) for a period of 48 hours to as much as 22 percent after 470 hours. The product was identified as in Example I; that is, by elemental infrared and mass spectrographic analyses. When the reaction was run at 100° C., a product whose infrared spectrum was consistent with the formulation HC 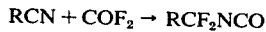 CNCO was formed.

While in the preceding description we have described a novel synthetic route to the formation of a doubly fluorinated organic isocyanate in the alpha carbon adjacent the NCO group, it is also clear that diisocyanate can be produced by a similar reaction. For example, the reaction between succinonitrile and $COF_2$ will yield the corresponding diisocyanate, $OCNCF_2CH_2CF_2NCO$, which is suitable for reaction with dialcohols to form polyurethanes or substituted ureas when reacted with diamines.

What is claimed is:

1. A method for synthesizing an alkyl isocyanate which is doubly fluorinated at the carbon position adjacent to the isocyanate which comprises reacting carbonyl fluoride with an alkyl nitrile in anhydrous liquid hydrogen fluoride or an inert organic solvent containing catalytic quantities of fluoride at a temperature in the range 0°–80° C. and thereafter recovering the resultant α,α-difluoroalkyl isocyanate.

2. The method according to claim 1 wherein the alkyl nitrile is acetonitrile and the product obtained is α,α-difluoroethyl isocyanate.

* * * * *